(12) United States Patent
Taguchi

(10) Patent No.: US 6,921,333 B2
(45) Date of Patent: Jul. 26, 2005

(54) INFORMATION SUPPLY SYSTEM AND PROGRAM FOR A MULTI-PLAYER GAME

(75) Inventor: Masami Taguchi, Kawasaki (JP)

(73) Assignee: Namco, Ltd., Tokyo (JP)

( * ) Notice: Subject to any disclaimer, the term of this patent is extended or adjusted under 35 U.S.C. 154(b) by 337 days.

(21) Appl. No.: 10/088,013

(22) PCT Filed: Jul. 5, 2001

(86) PCT No.: PCT/JP01/05839

§ 371 (c)(1),
(2), (4) Date: Apr. 24, 2002

(65) Prior Publication Data
US 2002/0151338 A1 Oct. 17, 2002

(30) Foreign Application Priority Data
Jul. 19, 2000 (JP) ........................ 2000-218955

(51) Int. Cl.[7] .............................................. A63F 13/00
(52) U.S. Cl. ............................................ 463/9; 273/429
(58) Field of Search .............................. 463/1, 29, 30, 463/31, 33, 37, 38, 40, 22, 47, 9; 273/429–432

(56) References Cited
FOREIGN PATENT DOCUMENTS

| JP | A 6-165879 | 6/1994 | | |
|----|-----------|--------|---|---|
| JP | A 10-328416 | 12/1998 | | |
| JP | A 11-261724 | 9/1999 | | |
| JP | A 2000-22827 | 1/2000 | | |
| JP | 2000-022827 | * 1/2000 | ............ | A63F/13/00 |
| JP | A 2000-162959 | 6/2000 | | |
| JP | 2000-162959 | * 6/2000 | ............ | A63F/13/00 |

* cited by examiner

Primary Examiner—Kim Nguyen
(74) Attorney, Agent, or Firm—Oliff & Berridge, PLC

(57) ABSTRACT

In order to provide an information supply system and a program for a multi-player game that are capable of giving dramatic development to a game story based on selections input by the players, a system is provided with a game information generation section which generates game information and a transfer section which supplies the generated game information to a portable telephone and acquires selection input information of the players. The game information generation section is used to generate game information allowing selection inputs by first and second players and response information corresponding to selection inputs by the first and second players, and the transfer section is used to supply the game information and response information to the portable telephones operated by the first and second players.

12 Claims, 9 Drawing Sheets

FIG. 6

| USER ID | USER NAME | MAIL ADDRESS | REGION | ... |
|---|---|---|---|---|
| 00000123 | NAKAMURA TARO | aa@aa.co.jp | TOKYO | ... |
| 00000169 | USHIJIMA JIRO | bb@aa.co.jp | FUKUOKA | ... |
| ... | ... | ... | ... | ... |

| USER ID | USER NAME | ROLE | SELECTION AUTHORITY FLAG | RESPONSE COMPLETED FLAG | SELECTION | POINTS | ... |
|---|---|---|---|---|---|---|---|
| 00000123 | NAKAMURA | DETECTIVE | ON | ON | 1 | 3 | ... |
| 00000169 | USHIJIMA | PERPE-TRATOR | ON | OFF | 0 | 0 | ... |

122

US 6,921,333 B2

INFORMATION SUPPLY SYSTEM AND PROGRAM FOR A MULTI-PLAYER GAME

TECHNICAL FIELD

The present invention relates to an information supply system and a program for a multi-player game.

BACKGROUND ART

Multiple-story games and multiple-ending games, in which the story or ending of each game is based on selection inputs of the players, are provided.

However, in such prior-art games, changes in the contents of a game are based on the selection inputs of one player.

The recent spread of networks such as the Internet has made it possible to popularize network games.

In a network game, one game space is shared between a plurality of players. With such a game space, however, the plurality of players can make selections and move about at will, so that the selection of one player has little effect on the other players. For that reason, each player is unable to fully enjoy a game in which factors such as the choices made by a plurality of players within a common game space are mutually influential.

In a game in which the game story progresses in accordance with selections made by the players, particularly in an adventure game or the like, it is extremely important to produce a game in which factors such as the selections made by a plurality of players are mutually influential.

DISCLOSURE OF THE INVENTION

The present invention was devised in the light of the above described technical situation and may provide an information supply system and a program for a multi-player game that are capable of giving dramatic development to a game story based on selections input by the players.

(1) In order to address the above described technical problems, there is provided an information supply system for a multi-player game comprising:

information generation means which generates information used to perform the multi-player game at a predetermined terminal device, wherein variations in a story are based on a selection input by a player;

supply means which supplies the generated information to the terminal device; and acquisition means which acquires selection input information input by a player through the terminal device, wherein the multi-player game is an individual selection input type of game wherein different responses are output in correspondence to selection inputs;

wherein the information generation means generates:

first game information allowing a selection input by a first player when an event requiring a selection input by the first player occurs in the game;

first response information corresponding to a selection input by the first player acquired by the acquisition means;

second game information allowing a selection input by a second player when an event requiring a selection input by the second player occurs in the game; and second response information corresponding to a selection input by the second player acquired by the acquisition means; and wherein the supply means supplies:

the first game information to a terminal device operated by the first player;

the second game information to a terminal device operated by the second player; and the first and second response information to the terminal devices of the first and second players.

(2) According to the present invention, there is also provided a program embodied on an information storage medium or in a carrier wave, and used to supply information that is used to perform a multi-player game at a predetermined terminal device, wherein variations in a story are based on a selection input by a player, the program implementing in a computer:

information generation means which generates the information used to perform the multi-player game;

supply means which supplies the generated information to the terminal device; and acquisition means which acquires selection input information input by a player through the terminal device, wherein the multi-player game is an individual selection input type of game wherein different responses are output in correspondence to selection inputs;

wherein the information generation means generates:

first game information allowing a selection input by a first player when an event requiring a selection input by the first player occurs in the game;

first response information corresponding to a selection input by the first player acquired by the acquisition means;

second game information allowing a selection input by a second player when an event requiring a selection input by the second player occurs in the game; and second response information corresponding to a selection input by the second player acquired by the acquisition means; and wherein the supply means supplies:

the first game information to a terminal device operated by the first player;

the second game information to a terminal device operated by the second player; and the first and second response information to the terminal devices of the first and second players.

The present invention makes it possible to supply the response information in common to the terminal devices of the players, where the response information is generated by the selections performed by the players individually. This ensures that the terminal devices display substantially the same game images and substantially the same game sound. In other words, a selection made by a first player influences details of the game of a second player, and a selection made by the second player influences details of the game of the first player.

Since each player therefore experiences changes in the details of his or her own game story caused by a selection made by the other player, it is possible to feel an interest in this multi-player game that is not present in a prior-art single-player game.

Note that a game in which an opportunity of selection is selectively given to a player in this case corresponds to a simulation game, role-playing game, adventure game, or fortune-telling game, by way of example.

(3) In this information supply system or program, the information generation means may cause the generation of an event requiring a selection input by the first and second player, based on the game situation.

This makes it possible for a device on the information supply side to control the passing of the selection authority to one of the players, based on the game situation. This also makes it possible to pass the selection authority not only in a simple sequence such as first player, second player, third player, then first player, but also in a complicated sequence such as first player, third player, second player, then third player again.

This makes the game development more interesting, thus increasing the degree of satisfaction of the players with respect to the game.

(4) This information supply system may further comprise mail generation means which generates notice information notifying receipt of a selection input in electronic mail format, when the acquisition means acquires a selection input by the first or second player; and the supply means may supply the generated notice information as electronic mail to the terminal device operated by the second or first player.

(5) This program may further implement in a computer, mail generation means which generates notice information notifying receipt of a selection input in electronic mail format, when the acquisition means acquires a selection input by the first or second player; and the supply means may supply the generated notice information as electronic mail to the terminal device operated by the second or first player.

This makes it possible for a player to check that other players have input selections, by electronic mail. This also enables the player to perform other operations such as web site browsing on the Internet while the connection to the game network is down. In other words, each player can utilize time efficiently, since it is not necessary to wait in a state in which the connection to the game network is maintained until the other players have completed their selection inputs.

(6) In this information supply system or program, the acquisition means may acquire personal information including identification information of a player and a captured image of a player, through a personal information input device having input means and capturing means; and the information generation means may use the acquired personal information to generate the information to be used to perform the multi-player game.

This makes it possible to display facial photographs of the players and game images that introduce profiles of the players, on the terminal devices. This creates affinity and a feeling of solidarity between the players, thus making the multi-player game even more enjoyable.

(7) According to the present invention, there is provided another information supply system for a multi-player game comprising:

information generation means which generates information used to perform the multi-player game at a predetermined terminal device based on a selection input by a player;

supply means which supplies the generated information to the terminal device; and acquisition means which acquires selection input information input by a player through the terminal device, wherein the multi-player game is a simultaneous selection input type of game wherein different responses are output in correspondence to selection inputs;

wherein the information generation means generates:

game information allowing selection inputs by first and second players when a predetermined event requiring a selection input occurs in the game; and response information corresponding to selection inputs by the first and second players acquired by the acquisition means; and wherein the supply means supplies the game information and response information to terminal devices operated by the first and second players.

(8) According to the present invention, there is provided another program embodied on an information storage medium or in a carrier wave, and used to supply information that is used to perform a multi-player game at a predetermined terminal device based on a selection input by a player, the program implementing in a computer:

information generation means which generates the information used to perform the multi-player game;

supply means which supplies the generated information to the terminal device; and acquisition means which acquires selection input information input by a player through the terminal device, wherein the multi-player game is a simultaneous selection input type of game wherein different responses are output in correspondence to selection inputs;

wherein the information generation means generates:

game information allowing selection inputs by first and second players when a predetermined event requiring a selection input occurs in the game; and response information corresponding to selection inputs by the first and second players acquired by the acquisition means; and wherein the supply means supplies the game information and response information to terminal devices operated by the first and second players.

The present invention supplies the response information that is generated in correspondence to simultaneous selections performed by the players within a predetermined time, in common to the terminal devices of the players. This ensures that substantially the same game images are displayed and substantially the same game sounds are output to the terminal devices.

In other words, game details such as the development of the game story are modified not only by the selections of one player, but also by the selections of the other players.

Since each player therefore experiences changes in the details of his or her own game story caused by a selection made by the other player, it is possible to feel an interest in this multi-player game that is not present in a prior-art single-player game.

Note that a simultaneous selection input type of game in this case corresponds to a simulation game, role-playing game, adventure game, fortune-telling game, or quiz game, by way of example.

(9) This information supply system may further comprise determination means which automatically determines a content of a selection input when the acquisition means has not acquired any selection input information from a player within a predetermined time; and the information generation means may use a selection input having a content determined by the determination means to generate the information used to perform the multi-player game.

(10) This program may further implement in a computer, determination means which automatically determines a content of a selection input when the acquisition means has not acquired any selection input information from a player within a predetermined time; and the information generation means may use a selection input having a content determined by the determination means to generate the information used to perform the multi-player game.

This makes it possible to prevent the occurrence of a state in which there is a long time waiting for a response, when there is no response from a player. Since this reduces the maximum waiting time, each player can play the game smoothly.

(11) In this information supply system or program, the determination means may determine a content of a selection input for at least one of the first and second players at random, or by a lottery, or based on any one of the selection input order, time elapsed in a selection input, a time at which a selection input is done, a game score, the state of game progress, and a region to which the first or second player belongs.

This makes it possible to provide variations in the game progress by making determinations based on at least one of the above criteria.

If, for example, the region of a first player is Osaka and the region of a second player is Tokyo, priority may be given to the first player's selection of selection choices presented in Osaka dialect and the second player's selection of selection choices presented in Tokyo dialect.

In this information supply system and program, the selection input information could be information that is based on at least one of character-string input and key input.

This enables different response outputs in developments in the game story, for example, by having the players select items, input dialog, select character movements, or the like.

Since this therefore means that the difference in one selection input can produce a different game story the next time the game is played, particularly if it is a game played repeatedly by several people, the players can enjoy the game for a long time without becoming sick of it.

In this information supply system and the program, the information generation means could cause changes in predetermined game parameters that are used in the generation of the game information, based on the selection inputs of the players.

If, for example, a player selects a desirable point from the game development point of view, the game parameters of that player or both that player and another player could be changed in accordance with that player's desire.

More specifically, if the selections of a player playing a male role and a player playing a female role match in a couples game, the degree of compatibility could be increased by ten points.

This makes it possible to ensure that a multi-player game is more interesting.

Note that game parameters in this case refer to factors such as the degree of compatibility, points gained, number of coins, and the life force, attacking force, and defensive force of the characters.

In this information supply system and the program, the terminal device could be a portable type of terminal device.

This makes it possible for anyone to enjoy the multi-player game, at any time and at any place.

Note that a portable type of terminal device in this case refers to a portable type of telephone set such as a mobile phone, a personal digital assistant having communications functions, a portable type of PC having communications functions, or a portable type of game machine having communications functions.

In this information supply system and program, the portable type of terminal device could be a portable type of telephone set.

Note also that the portable type of telephone set in this case could be a portable telephone, a personal handyphone system (PHS) unit, or a portable telephone that employs satellite communications.

In this information supply system and program, the terminal device could be an arcade game machine.

This makes it possible for a player at a game establishment or the like to enjoy a multi-player game wherein the selections of the players affect each other, using the insertion of a coin or a previously purchased game card.

In the information supply system and program, the arcade game machine could comprise means for outputting game information that is generated on the basis of the personal information, in a predetermined format.

This makes it possible for players to print out facial photographs and player profiles of themselves and their partners, for output on paper or cards. This creates affinity and a feeling of solidarity between the players, thus making the multi-player game even more enjoyable.

BRIEF DESCRIPTION OF THE DRAWINGS

FIG. 6 is a schematic view of the data configuration of user data in accordance with this example of this embodiment.

FIG. 7 is a schematic view of the data configuration of partner data in accordance with this example of this embodiment.

BEST MODE FOR CARRYING OUT THE INVENTION

The present invention is described below with reference to the accompanying figures, taking as an example of the application thereof the use in an information supply system that supplies game information for implementing an adventure game of a multiple-story type of multi-player style, in which the selections by the players cause variations in the game story. Note that the embodiments described below do not in any manner limit the scope of the invention laid out herein. Furthermore, the entire configuration of the embodiment described below is not limited as means for resolving the invention as laid out in this application.

Outline of Game System

Figure 1:
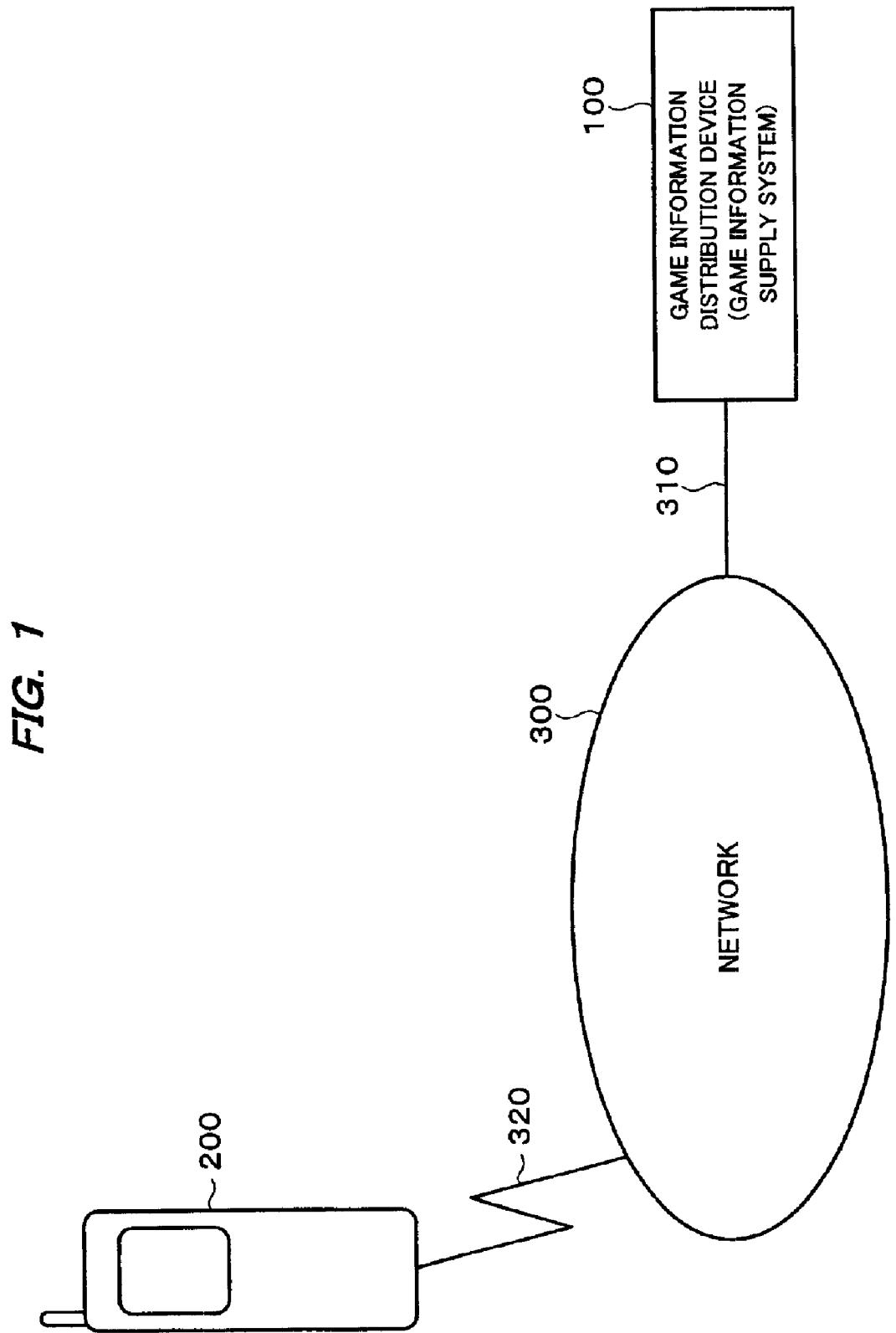
FIG. 1 is a schematic view of a game system in accordance with an example of one embodiment of the present invention.

A schematic view of a game system in accordance with an example of this embodiment is shown in FIG. 1.

The game system comprises a portable telephone 200, which is a portable type of terminal device with which the player plays the game, and a game information distribution device 100, which generates game information based on distribution request information (comprising selection information and operating information or the like) that is transmitted over a transfer path from the portable telephone 200, and which functions as a game information supply system for transmitting game information to the portable telephone 200.

In this case, the game information distribution device 100 and the portable telephone 200 are connected together by a network 300. The transfer path between the game information distribution device 100 and the portable telephone 200 comprises a wireless transfer path 320 and a wired transfer path 310.

Note that entities such as ground stations, packet assembly/disassembly devices, and the Internet are disposed within the network 300. In practice, a plurality of the portable telephones 200 are connected to the game information distribution device 100 by the network 300.

A player uses the portable telephone 200 to connect to the network 300. The portable telephone 200 transmits to the game information distribution device 100 some distribution request information that has been generated on the basis of the player's operations. Game information is generated by the game information distribution device 100 in answer to the distribution request and is transmitted to the portable telephone 200.

The portable telephone 200 receives game information from the game information distribution device 100, and executes a game by displaying game images on a screen and outputting sounds.

In a multi-player game played by a plurality of players (a plurality of human players, or a combination of human players and computer players), game details are in common between players that have formed groups of similar players (also called "coupling").

If a multi-player game is implemented by grouping in this manner, the selection inputs of players that form each group affect each other, but it is important to ensure that the game is more interesting.

These selection inputs are implemented by having the player use means such as the arrow keys of the portable telephone 200 to select one or a plurality of selection choices from a plurality of selection choices that are displayed on the screen of the portable telephone 200.

Methods of inducing the players to perform selection inputs in a multi-player game are a method by which a selection authority that permits selection input is passed between players in sequence (individual selection input method) and a method by which the players are granted the selection authority substantially simultaneously (simultaneous selection input method).

The description below first deals with the individual selection input method, followed by the simultaneous selection input method.

The following describes transitions in the game images displayed on the screen of the portable telephone 200. This embodiment of the present invention is described on the assumption that this is an adventure game wherein a first player participates in the game as a detective and a second player participates as a perpetrator role.

Figure 2:
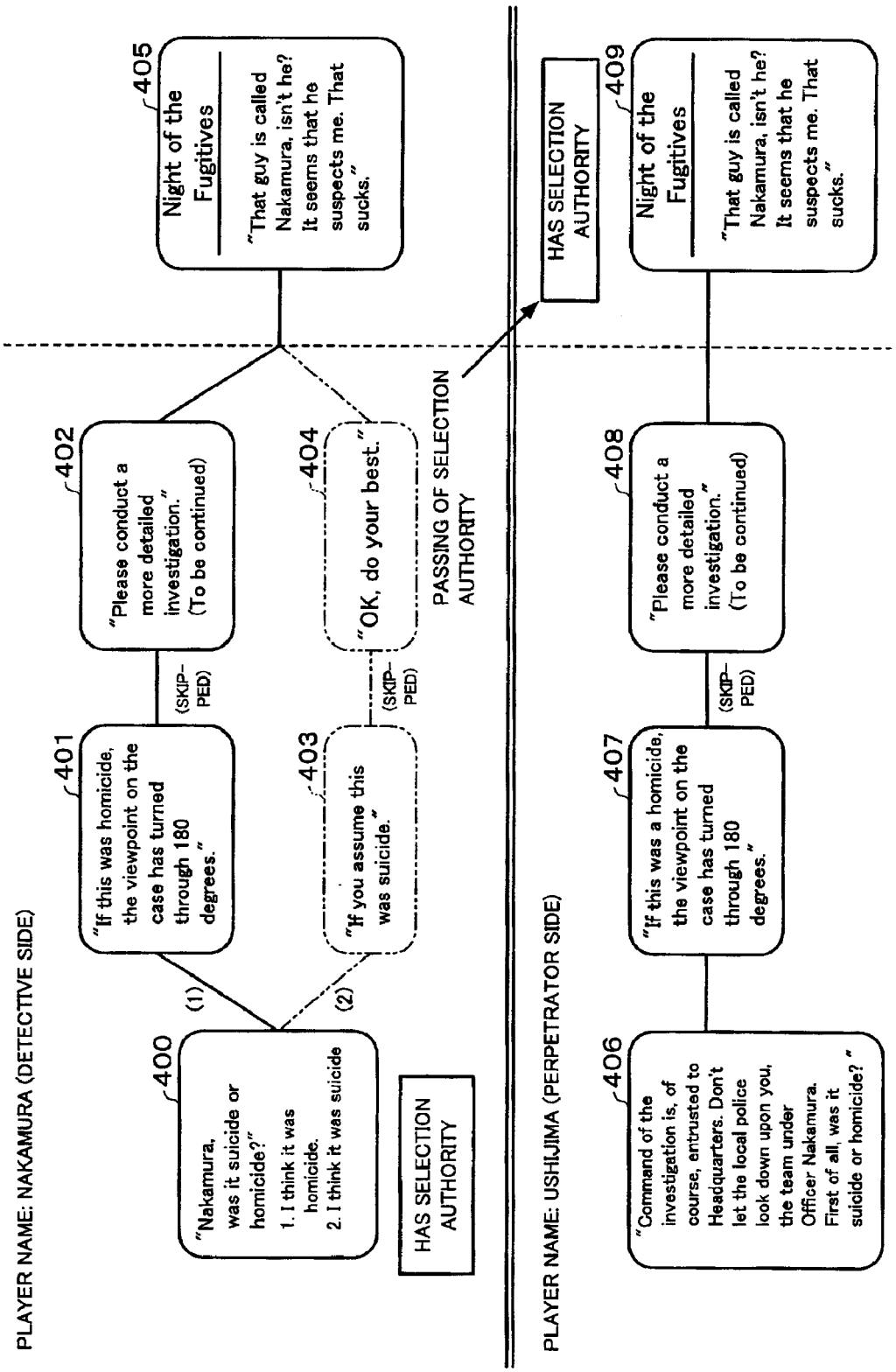
FIG. 2 shows image transitions when the selection authority passes from a detective side to a perpetrator side, in this example of this embodiment.

The image transitions shown in FIG. 2 are those that occur when the selection authority transfers from the detective side to the perpetrator side, in relation to an example of this embodiment.

With the individual selection input method, the initial selection authority is granted to a player called Nakamura, who is playing the detective, in a state in which the game has started. An image 400 is displayed to present a plurality of selection choices as to whether the case is suicide or homicide (1. "I think it was homicide" or 2. "I think it was suicide") is displayed on the screen of the portable telephone 200 of the player in the detective role, by way of example.

When the image 400 is displayed by the portable telephone 200 of the player in the detective role, an image 406 that differs from the image 400 is displayed on the screen of the portable telephone 200 of the player on the perpetrator side. The player in the perpetrator role can determine whether the player in the detective role has selected suicide or homicide, from reference to the image 406.

If the player in the detective role has selected 1. "I think it was homicide" from the image 400, images such as images 401 and 402 are then displayed on the portable telephone 200 of the player in the detective role. With the image 401, a character string relating to homicide is displayed, such as: "If this was a homicide, the viewpoint on the case has turned through 180."

In such a case, images 407 and 408, which are similar to the images 401 and 402, are displayed on the portable telephone 200 of the player in the perpetrator role.

If the player in the detective role has selected 2. "I think it's suicide," images such as images 403 and 404 are displayed on the portable telephone 200 of the player in the detective role. The image 403 displays a character string relating to suicide, such as "If you assume this was suicide."

In such a case, images similar to the images 403 and 404 are displayed on the portable telephone 200 of the player on the perpetrator side.

If an event that has to be selected by the player on the perpetrator side occurs after an image corresponding to the selection of the player in the detective role has been displayed, the selection authority passes from the player in the detective role to the player in the perpetrator role.

After the display of the image corresponding to the selection of the player in the detective role, images are displayed in common on the portable telephones 200 of each of the detective player and the perpetrator player, such as image 405 or 409.

The description now turns to image transitions after the selection authority has passed to the player in the perpetrator role.

Figure 3:
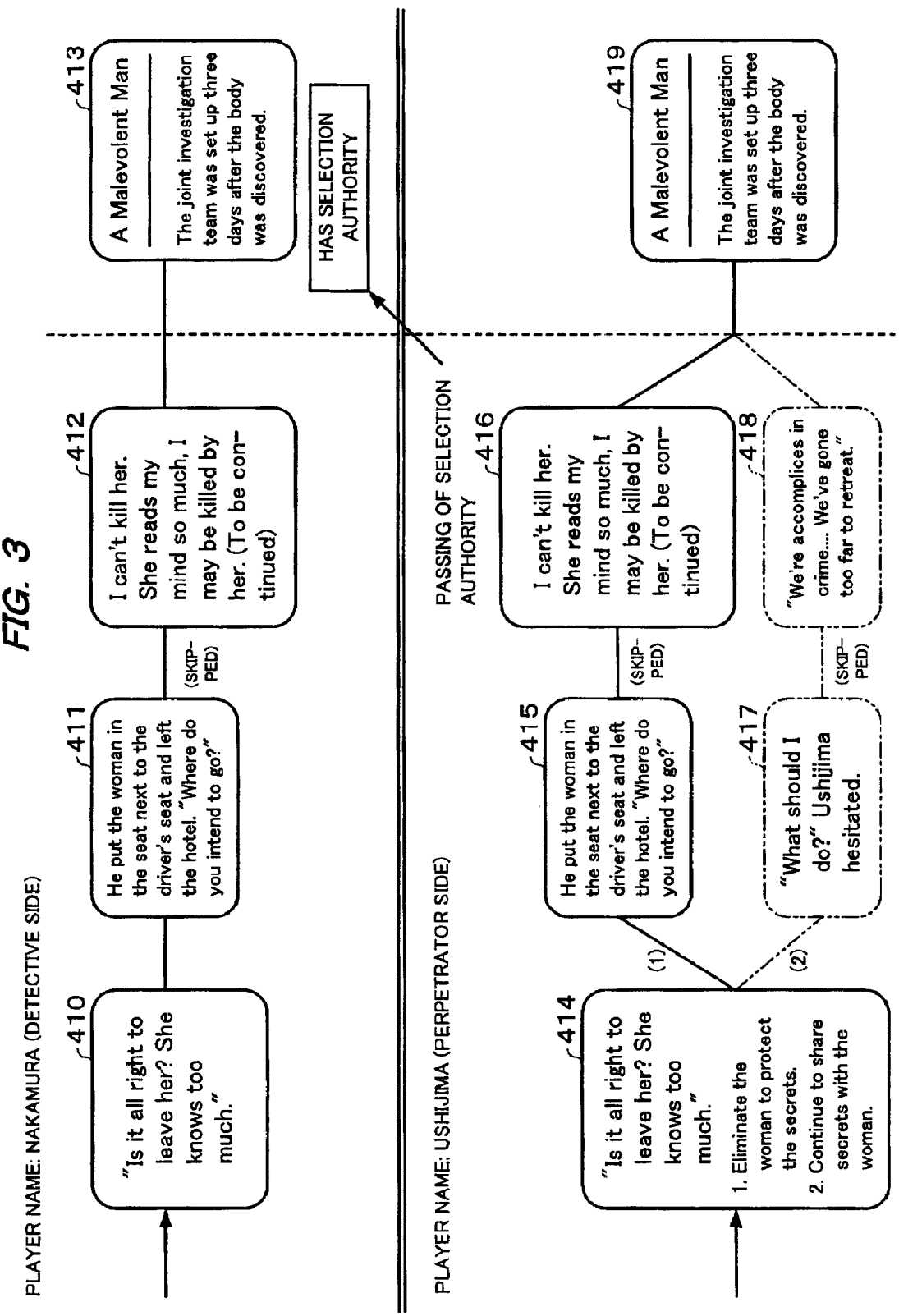
FIG. 3 shows image transitions when the selection authority passes from the perpetrator side to the detective side, in this example of this embodiment.

The image transitions shown in FIG. 3 are those that occur when the selection authority transfers from the perpetrator side to the detective side, in relation to an example of this embodiment.

In a state in which the selection authority has passed to the player in the perpetrator role, an image 414 providing a plurality of selection choices relating to secret protection (1. "Eliminate the woman to protect the secrets" and 2. "Continue to share secrets with the woman") is displayed on the screen of the portable telephone 200 of the player in the perpetrator role.

In that case, an image 410 that differs from the image 414 is displayed on the portable telephone 200 of the player on the detective side.

If the player in the perpetrator role has selected 1. "Eliminate the woman to protect the secrets", images such as images 415 and 416 are displayed on the portable telephone 200 of the player in the perpetrator role. The image 415 is displayed as a character string corresponding to the elimination of the woman, such as: "He put the woman in the seat next to the driver's seat and left the hotel."

In that case, images 411 and 412 that are the same as the images 415 and 416 are displayed on the portable telephone 200 of the player in the detective role.

If the player in the perpetrator role has selected 2. "Continue to share secrets with the woman," on the other hand, images such as images 417 and 418 are displayed on the portable telephone 200 of the player in the perpetrator role. The image 417 displays a character string relating to sharing the secret with the woman, such as: "'What should I do?' Ushijima hesitated."

In that case, the images 417 and 418 are displayed on the portable telephone 200 of the player in the detective role.

If an event occurs that the player on the detective side has to select, after an image corresponding to the selection of the player in the perpetrator role has been displayed, the selection authority passes from the player in the perpetrator role to the player in the detective role.

After the display of the image corresponding to the selection of the player in the perpetrator role, several images that are common to both the detective role and the perpetrator role are displayed on the portable telephone 200 of each player, such as images 413 and 419.

Note that it can happen that only one player is granted the selection authority, as described above, but it can also happen that all players are granted the selection authority simultaneously.

The description now turns to image transitions in the simultaneous selection input method in which all the players are granted the selection authority simultaneously.

Figure 4:
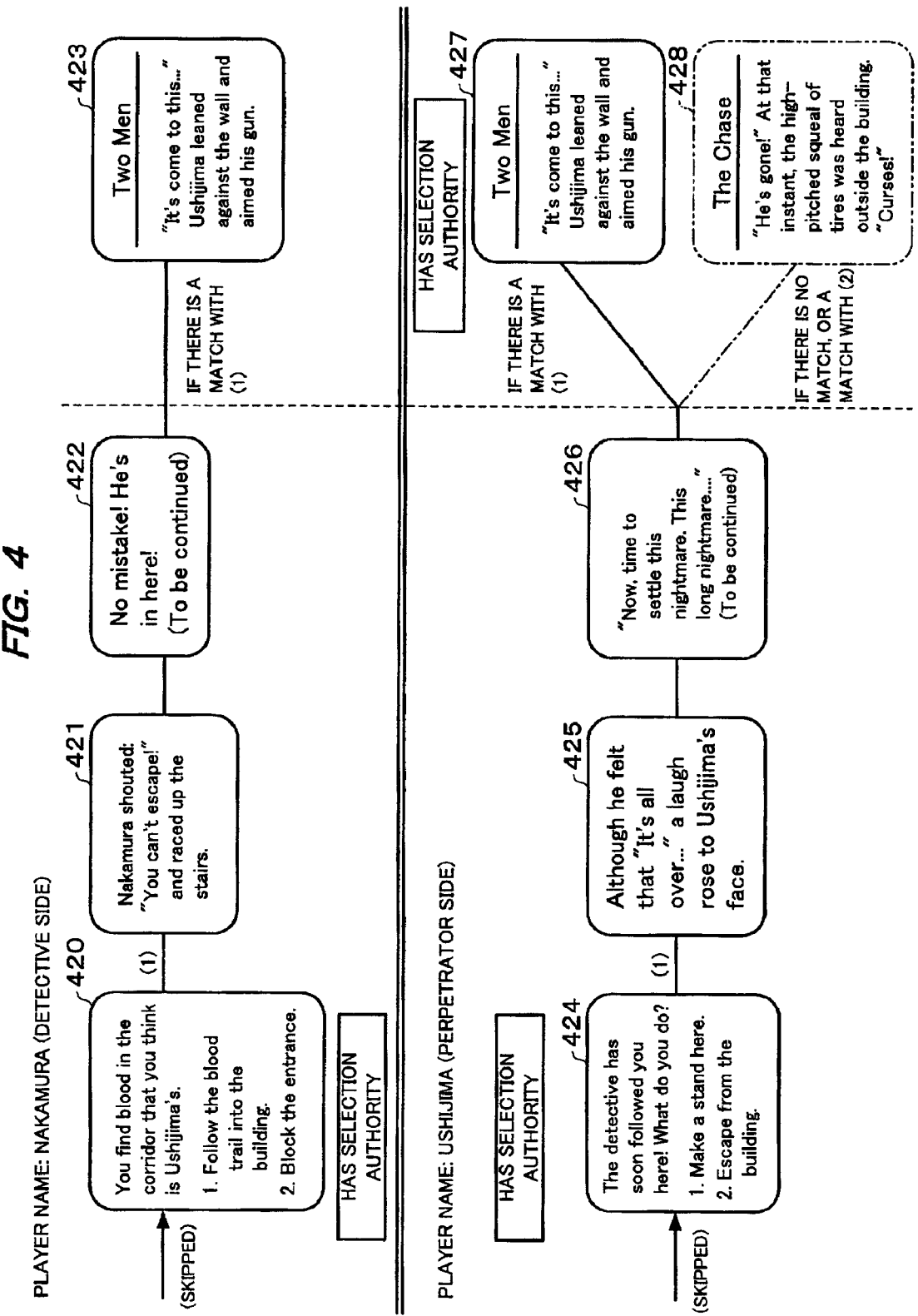
FIG. 4 shows image transitions when both the detective side and the perpetrator side have the selection authority, in an example of this embodiment.

The image transitions shown in FIG. 4 are those that occur when both the perpetrator side and the detective side have the selection authority, in relation to an example of this embodiment.

At this point, assume a situation in which Nakamura, who is controlling the player in the detective role, has chased Ushijima, who is controlling the player in the perpetrator role, into a building.

An image 420 is displayed on the screen of the portable telephone 200 of the player in the detective role, to provide a plurality of selection choices for trapping the perpetrator (1. "Follow the blood trail into the building" 2. "Block the entrance").

At the same time, an image 424 is displayed on the screen of the portable telephone 200 of the player in the perpetrator role, to provide a plurality of selection choices for escaping from the detective (1. "Make a stand here" 2. "Escape from the building").

At this point, assume that the player in the detective role selects 1. "Follow the blood trail into the building" and the player in the perpetrator role selects 1. "Make a stand here."

Since both the detective and the perpetrator are in the building in this case, an images such as images 421 and 422 that are specific to the detective role are shown on the screen of the player in the detective role, together with an image such as an image 423 that is common to the perpetrator role as well.

Similarly, images such as images 425 and 426 that are specific to the perpetrator role are displayed on the screen of the player in the perpetrator role, together with an image such as an image 427 that is common to the detective role as well.

More specifically, the character string: "'It's come to this . . . ' Ushijima leaned against the wall and aimed his gun." is displayed as the images 423 and 427, by way of example.

If the player in the detective role has selected 2 from the image 420 and the player in the perpetrator role has selected 2 from the image 424, an image 428 is displayed. If the selections made by the player in the detective role and the player in the perpetrator role are different (if, for example, the player in the detective role selects 1 and the player in the perpetrator role selects 2), the image 428 is displayed.

In other words, details of the images and transitions of the images displayed on the portable telephone 200 of each player will differ according to the selections made by the players.

In FIGS. 2 to 4 described above, the game information distribution device 100 causes the generation of predetermined events based on the game situation, and allocates the selection authority to the players in answer to those events. In addition, the game information distribution device 100 determines the selection input of each player, and generates suitable game information for distribution to the portable telephones 200 of the players, based on factors such as whether or not the selection authority has been set and whether or not there is a match between the selection choices selected by the players.

The above processing makes it possible to vary the game story in accordance with the selections made by other players, and thus provide the players with a more realistic multi-player game, by granting the selection authority individually to each player or granting it simultaneously to the players.

The description now turns to the functional blocks of a game system comprising the game information distribution device 100 for implementing the above functions.

Figure 5:
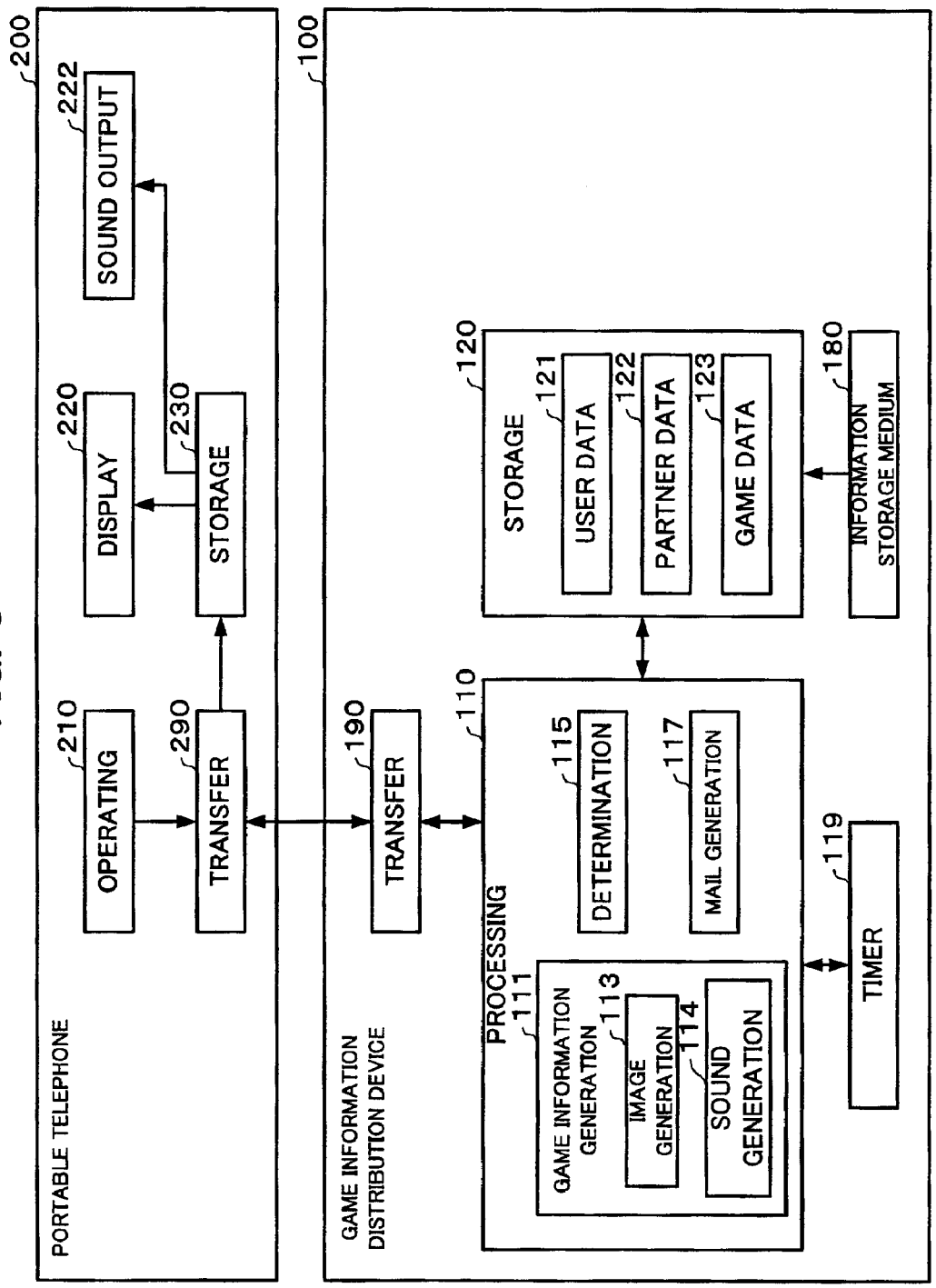
FIG. 5 is a functional block diagram of a game system in accordance with an example of this embodiment.

A functional block diagram of a game system in accordance with an example of this embodiment is shown in FIG. 5.

The portable telephone 200 comprises an operating section 210 configured of components such as character input keys, a transfer section 290 that transmits distribution request information comprising operating information from the operating section 210 and receives game information from the game information distribution device 100, the storage section 230 that temporarily stores the received game information, a display section 220 that uses a browser to shape game images for display on a liquid-crystal screen, based on the game information stored in the storage section 230, and a sound output section 222 that outputs game sounds based on that game information.

Note that the game information in this case is information relating to the game, such as data, a program, or an object combining data and a program, for implementing the game, by way of example. This game information also comprises information for reproducing game sounds, in addition to game images.

The game information distribution device 100 comprises a transfer section 190, which functions as an acquisition means and supply means for receiving (acquiring) distribution request information from the portable telephone 200 and transmitting (supplying) game information, and a game information generation section 111, which functions as an information generation means for identifying which portable telephone 200 has transmitted and generating game information based on the received distribution request information. Note that the transfer section 190 has both a supply function and an acquisition function, but the transfer section 190 could also be divided into separate supply means and acquisition means.

The game information generation section 111 comprises an image generation section 113, which generates image information for displaying images on the portable telephone 200, and a sound generation section 114, which generates sound information for the output of sounds by the portable telephone 200

The game information generation section 111 also comprises an image generation section 113 that generates image information for the display of images on the portable telephone 200 and a sound generation section 114 that generates sound information for the output of sounds by the portable telephone 200.

The game information distribution device 100 further comprises a determination section 115 that determines requests based on request information transmitted from the portable telephone 200 and a mail generation section 117 that generates electronic mail. If there is no response from the portable telephone 200 within the predetermined time, based on the value of the timer section 119, the determination section 115 determines that there has been no response and performs predetermined processing.

Note that image information, sound information, and electronic mail are types of game information. The image generation section 113, the sound generation section 114, and the mail generation section 117 each generate game information as appropriate, with reference to user data 121, partner data 122, and game data 123 stored in a storage section 120 that has a predetermined storage area.

The game information generation section 111, the determination section 115, and the mail generation section 117 are comprised within a processing section 110, and the functions thereof could be implemented by means such as a CPU. More specifically, the image generation section 113 is configured in such a manner that it generates game image pages dynamically, by software that uses the common gateway interface (CGI).

The storage section 120 is implemented by means such as RAM and the transfer section 190 is implemented by means such as a communications device having a packet assembler/disassembler (PAD) function, by way of example.

Note that it is also possible to have a configuration in which an information storage medium 180 is connected to the game information distribution device 100, whereby the functions thereof can be implemented by reading a program from that information storage medium 180. For an implementation of the game information generation section 111 in this case, by way of example, the above described program is for implementing the information generation means that generates the game information and the supply means that supplies the thus-generated game information to each portable telephone 200.

The program stored in the information storage medium 180 could be implemented (embodied) by carrier waves. In other words, it is possible to implement the previously described functions by having the game information distribution device 100 fetch information through the network from a predetermined host terminal or the like, without using the information storage medium 180.

Note that a storage medium using a laser or magnetic means, such as a CD-ROM, DVD-ROM, IC card, ROM, RAM, memory card or hard disk, could be used as the information storage medium 180. In addition, the method of reading out information (the program) from the information storage medium 180 could be a direct method or an indirect method.

The description now turns to the data configuration of the above described user data 121.

A schematic view of the data configuration of the user data 121 in accordance with an example of this embodiment is shown in FIG. 6.

The user data 121 is data for managing personal information of the user. The data items of the user data 121 correspond to details such as "User ID", "User Name", "mail address", and "region", which form user identification information.

The game information generation section 111 can recognize that the user has an "User ID" of "00000123", a "User Name" of "Nakamura Taro", a "mail address" of "aa@aa.co.jp", and is in the "region" of "Tokyo, by referencing the user data 121.

The description now turns to the data configuration of the above described partner data 122.

A schematic view of the data configuration of the user partner data 122 in accordance with an example of this embodiment is shown in FIG. 7.

The partner data 122 is data for recognizing the user linked thereto, and also for recognizing the game situation of each user. The data items in the partner data 122 correspond to details such as "User ID", "User Name", "Role", "Selection authority flag", "Response completed flag", "Selection", and "Points".

In this case, the "User Name" is the name of a game character or the like, which has been input by the user from the setting screen. Similarly, the "Role" is the role of the game character, which has been selected to be "detective" by the user from the setting screen.

The "Selection authority flag" indicates whether or not each player has the selection authority at the current point and the "Response completed flag" indicates whether or not each player has made a response at the current point.

Similarly, "Selection" indicates the number of the option that has been selected by each player, and "Points" indicates the number of points obtained by each player at the current time.

Note that "User ID" of the partner data 122 is linked to "User ID" of the user data 121, so that "User ID" can be used as a key for purposes such as searching the user data 121 and the partner data 122.

The description now turns to the operation of the various components of the game information distribution device 100 from the progression of the game described with reference to FIGS. 2 to 4 up until the ending thereof, with reference to a flowchart.

Figure 8:
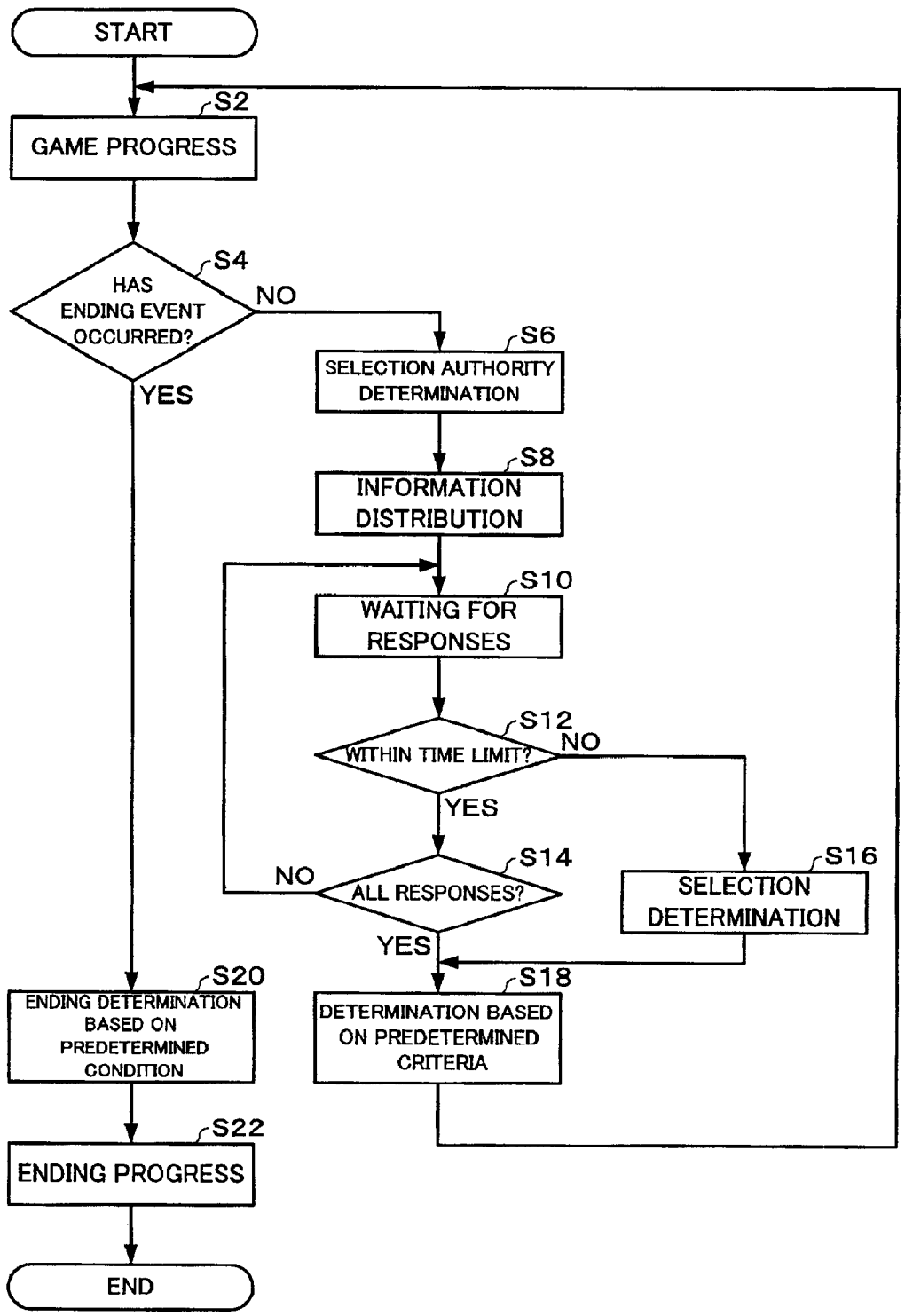
FIG. 8 is a flowchart of the ending sequence in accordance with this example of this embodiment.

A flowchart of the sequence up until the ending in accordance with an example of this embodiment is shown in FIG. 8.

First of all, the game information generation section 111 generates game information for creating a predetermined event such as the above described selection of suicide or homicide, based on the game situation, and the transfer section 190 transmits that game information to the portable telephone 200. The portable telephone 200 displays game images and outputs game sounds, based on that game information, to move the game forward on the portable telephone 200 (step S2).

This displays the predetermined image transitions of the various images shown in FIGS. 2 to 4 on the portable telephone 200 of each player.

During the progress of the game, the determination section 115 allocates the selection authority to the players, provided the ending event has not occurred (step S4). The progress of the game is based on the players' selections.

The determination section 115 determines the selection authority for allocating the selection authority to at least one of the player in the detective role and the player in the perpetrator role, by way of example, based on the state of progress of the game (step S6).

More specifically, the determination section 115 sets the "Selection authority flag" of the partner data 122 of the player who has the selection authority to "ON" and the "Selection authority flag" of the player who does not have the selection authority to "OFF". This makes it possible for the determination section 115 to identify which player currently has the selection authority, in a simple manner.

Once the selection authority is determined, the game information generation section 111 generates the game information for selection input and the transfer section 190 distributes that game information for selection input to the portable telephone 200 (step S8).

The game information distribution device 100 waits until there is a response from the player using the portable telephone 200 (step S10).

If the game information for selection input is distributed to the portable telephones 200 by the transfer section 190, the determination section 115 reads out the value in the timer section 119 and stores that value in the storage section 120 as the distribution date.

The determination section 115 determines whether or not there is a player response from the portable telephones 200 within a predetermined time from that response-waiting state, based on elapsed time from the stored distribution date (step S12).

If there is a response within the predetermined time, the determination section 115 changes the "Response completed flag" of the partner data 122 to 1 ("YES") and also determines whether or not there are responses from all the players, by referencing the value of the "Response completed flag" of each player (step S14).

If there are responses, the determination section 115 inputs the number selected by each player who responded into "Selection" of the partner data 122.

If all the responses are there, the determination section 115 determines the next development in the game story or the like, based on predetermined criteria (step S18).

In this case, the predetermined criteria could be factors such as the selection input order (for example, the first responder has priority or the last responder has priority), time elapsed in a selection input (for example, the responder within the shortest time has priority), a time at which a selection input is done (for example, a responder who made a selection input in the morning has priority), at random, by lottery, the state of the game score (for example, the responder with the highest score has priority), the state of progress of the game, or the region to which the player belongs.

This makes it possible to provide variations in the game progress by making determinations based on at least one of the above criteria.

If, for example, the region of a first player is Osaka and the region of a second player is Tokyo, priority may be given to the first player's selection of selection choices presented in Osaka dialect and the second player's selection of selection choices presented in Tokyo dialect.

Similarly, if a time at which a selection input is done is used as a criterion, by way of example, it is possible to set up a situation where the character operated by each player acquires a game hint by talking to an assistant in a Bakery, but a message such as "They are already asleep" is displayed to a player who accesses the Bakery at night, so that the player cannot use that selection, whereas a message such as "Welcome!" is displayed to a player who accesses the Bakery during the morning, enabling use of that selection. In other words, this makes it possible to determine which player's selection is adopted based on a time at which a selection input is done as a criterion.

The determination of selection could also be based on the result of a mini-game, by way of example.

Note that if all the responses are not there yet, the processing goes to a standby state in which it is waiting for responses (step S10).

The game information generation section 111 generates the game information for response output, based on the determinations of the determination section 115.

More specifically, the image generation section 113 generates image information based on those determinations, and the sound generation section 114 generates sound information based on those determinations.

The transfer section 190 distributes game information comprising this image information and sound information to the portable telephones 200.

The above sequence from selection authority setting (step S6) to game progression (step S2) repeats up until the ending event occurs.

Note that if there is no response from a player within a certain time, the determination section 115 automatically makes a selection for that player and the game information generation section 111 bases the generation of the game information on that determination.

In other words, if one player has not responded even after a predetermined time has elapsed, the determination section 115 automatically makes a selection for the player who has not responded. Since this makes it possible to prevent a situation in which the other players are continuing to wait, a plurality of players participating in the game can experience smooth progress of the game.

As described above, this embodiment of the invention ensures that the selection input of a certain player determines the development of the game story for the other players, thus making it possible for players to enjoy a highly dramatic game that is more realistic, in comparison with the prior art in which the selection of other players does not affect the development of the game story for the player.

In addition, the game information generation section 111 generates event for selection inputs with respect to the first and second players, based on the game situation, making it possible to control the granting of the selection authority to a chosen player by the game information distribution device 100 that is the game information supply side.

This also makes it possible to pass the selection authority not only in a simple sequence such as first player, second player, third player, then first player, but also in a complicated sequence such as first player, third player, second player, then third player again.

This makes the game development more interesting, thus increasing the degree of satisfaction of the players with respect to the game.

Together with the variations in the game story based on the selection inputs by the players, the game parameters for the players could also be changed.

Note that game parameters in this case refer to factors such as the degree of compatibility, points gained, number of coins, and the life force, attacking force, and defensive force of the characters.

If, for example, the player of the "Nakamura" role makes an appropriate selection with respect to a selection request in the game, the determination section 115 could increment the "Points" field of the partner data 122 by one.

In such a case, the game story could be varied based on a game parameter such as points.

Although the present invention has been described above as relating to a preferred embodiment, the present invention is not limited to that preferred embodiment.

Storage of Personal Information

Figure 9:
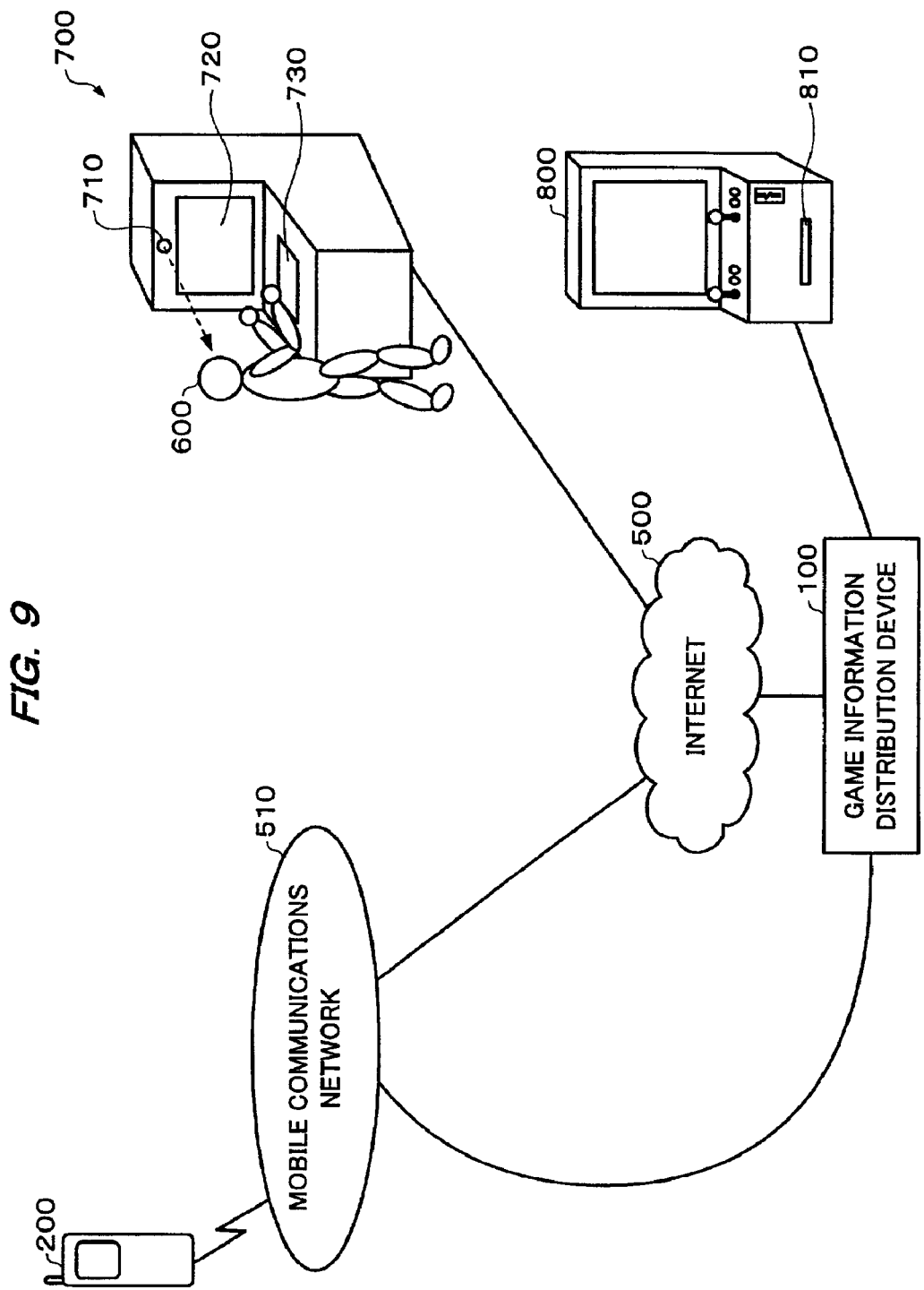
FIG. 9 is a schematic view of a game system in accordance with another example of one embodiment of the present invention.

A schematic view of another game system in accordance with an example of this embodiment is shown in FIG. 9.

This game system comprises the portable telephone 200, which is a portable type of terminal device, and the game information distribution device 100, which generates game information based on distribution request information transmitted from the portable telephone 200 over a transfer path and which functions as an information supply system that transmits game information to the portable telephone 200.

In this case, the game information distribution device 100 and the portable telephone 200 are connected by a mobile communications network 510. The game information distribution device 100 and a capture device 700 are connected together by the Internet 500. Note that the portable telephone 200 is also connected to the Internet 500 by the mobile communications network 510.

The capture device 700 is disposed within a game establishment such as a game center. The functional blocks of this game system will now be described.

The capture device 700 comprises an operating section 730 such as an operating panel operated by the user and a capture section 710 such as a CCD camera that images the user and generates a captured image, based on those operations.

The capture device 700 also comprises a display section 720 that performs display based on the operations of the user and data stored in a storage section, using a general-purpose processing device.

Note that the capture device 700 comprises transfer means for performing communications with the game information distribution device 100.

Note also that the configurations of the game information distribution device 100 and the portable telephone 200 are substantially similar to those described above. Functions such as control over the transfer of capture information are handled by the determination section 115.

The user of each portable telephone 200 goes to a game establishment that has the capture device 700 and operates the operating section 730 to obtain an image from the capture section 710. The capture section 710 transfers the captured data to a storage section within the capture device 700 and the display section 720 displays the captured image. The user uses the operating section 730 to utilize that captured image as part of that user's own user data 121. Note that the user also uses the operating section 730 to input personal information such as his or her own region and mail address, if necessary. The transfer section of the capture device 700 transmits personal information comprising the input capture information to the game information distribution device 100.

The game information distribution device 100 receives the capture information through the transfer section 190. The game information distribution device 100 stores the thus-received capture information as part of the user data 121, linked to that user.

If the game information distribution device 100 transmits electronic mail to the second player, for example, generates electronic mail that comprises the capture information of the first player that is stored in the user data 121 is generated by the image generation section 113. The second player can check the appearance of the first player by receiving that electronic mail.

By storing capture information for each player in the user data 121, it becomes possible for the game information distribution device 100 to produce characters that reflect the facial photographs of the players, when producing a game in which the players are formed into groups.

In addition, the system could be provided with an arcade game machine 800 having an output section 810 that prints personal information such as images captured by the capture device 700, as shown in FIG. 9. Players can play the above described multi-player game on the arcade game machine 800, by having game information distributed from the game information distribution device 100 to the arcade game machine 800.

This makes it possible for a player at a game establishment or the like to enjoy a multi-player game wherein the selections of the players affect each other, using the insertion of a coin or a previously purchased game card.

This makes it possible for players to print out facial photographs and player profiles of themselves and their partners. This creates affinity and a feeling of solidarity between the players, thus making the multi-player game even more enjoyable.

Note that various configurations other than that shown in FIG. 9 are also possible.

For example, the present invention could also be applied to a situation in which a game is played between players at separate locations, while each player is viewing the face of the other player that is being captured by a CCD camera. More specifically, the configuration could be such that game terminal devices, each comprising a CCD camera, a liquid-crystal screen, and an operating section, are disposed within a plurality of game establishments, the game establishments are connected together by optical fibers, and terminal devices within each game establishment are also connected by a LAN. Each player operates a terminal device and records details such as his or her own name in the user data 121 in the storage section 120 of the game information distribution device 100.

If each player is permitted to reference the personal information of the other players in such a case, personal information such as the names of the other players can be identified from the game information generated by the game information generation section 111 on the basis of the user data 121. Each player can also observe the states of the other players in real time, through the CCD cameras provided in the terminal devices.

The present invention can also be applied to the performance of a multi-player game in such a game environment.

Note that the personal information such as the players' names could also be revealed at the end of the game.

With a love simulation game, for instance, if the personal information of a first player and a second player is revealed to the other player when marriage occurs at the end of a game in which the first and second players manipulate characters to find kindred spirits, it may be sufficient to not reveal personal information to players that do not prove compatible.

Other Variations

Various other modifications to the application of the present invention can also be devised, in addition to the revealing of personal information.

For example, sound information other than electronic mail or image information could also be used as game information to the players or request information from the terminal devices such as the portable telephones 200.

In addition, character-string input or key input, or a combination thereof, could also be used as the selection inputs of the players, instead of the above described selection choices.

For example, details such as development of the game story could be made to differ by having the players select items, input dialog, or select character movements.

Since this therefore means that the difference in one selection input can produce a different game story the next time the game is played, particularly if it is a game played repeatedly by several people, the players can enjoy the game for a long time without becoming sick of it.

Other than an adventure game of the above described multiple-story type of multi-player style, the present invention is particularly applicable to a game in which the selections of the first player affect the game details for the second player, and also to a multiple-story or multiple-ending type of game (such as a simulation game, adventure game, role-playing game, or compatibility fortune-telling).

Note that multi-player games to which the present invention can be applied effectively are not just games played by a plurality of human players, but also games played between human and computer players.

Means for the transmission of information to the transfer section 190 could be used as the supply means for game information, but it is also possible to use means that distributes an agent to the portable telephone 200 as the acquisition means for the distribution request information, to acquire distribution request information that is stored in the portable telephone 200.

The method of supplying game information could be the above described method by which game information is supplied indirectly to the portable telephone 200 over the transfer path, or the portable telephone 200 could be connected directly to a game information supply device for the direct supply of game information.

It is also possible to distribute the functions of the game information distribution device 100 between a plurality of devices, or the processing of the capture device 700 and the game information distribution device 100 could be integrated as shown in FIG. 9.

In addition to images captured by the capture device 700, the captured images could be acquired by reading a photograph through a scanner, or by reading a film from a camera by a film scanner, or by using a digital camera, or by using a CCD camera incorporated in an arcade image display terminal.

The above embodiment was described with respect to an example in which the portable telephone 200 was used as the portable type of terminal device, but it is also possible to employ a device other than the portable telephone 200 as the portable type of telephone set, such as a PHS, a satellite communications telephone, or a pager. Other than a portable type of telephone set, it is possible to apply the present invention to any portable type of terminal device, such as a portable type of PC, a personal digital assistant or a portable type of game machine having communications functions.

Other than a portable type of terminal device, various other terminal devices, could be used such as the arcade game machine 800, a domestic game machine, or a PC.

The mail generation section 117 of the game information distribution device 100 could be used to inform other players that the selection input of one player has ended.

If something like 100 players have the selection authority in the simultaneous selection method, it may take some time for all of the players to complete their selections. In such a case, if the mail generation section 117 is used to send electronic mail stating that all of the players have completed their selections, it is not necessary for all the players to remain connected to the game network all the time, making it possible to suppress connection times and make efficient use of time.

Note that a method such as that described below could be employed as the method of implementing the above processing. The mail generation section 117 generates electronic mail with reference to the "mail address" of the user data 121, and that electronic mail is sent to the mail server by using the transfer section 190. Each player acquires the electronic mail generated by the mail generation section 117 from that mail server.

What is claimed is:

1. An information supply system for a multi-player game comprising:

information generation means which generates information used to perform the multi-player game at a predetermined terminal device, wherein variations in a story are based on a selection input by a player;

supply means which supplies the generated information to the terminal device; and acquisition means which acquires selection input information input by a player through the terminal device, wherein the multi-player game is an individual selection input type of game wherein different responses are output in correspondence to selection inputs;

wherein the information generation means generates:

first game information allowing a selection input by a first player when a first event requiring the first selection input by the first player occurs in the game, the first game information based on a first selection authority flag indicating that the first player has selection authority;

first response information corresponding to the first selection input by the first player acquired by the acquisition means based on a first response completed flag indicating that the first selection input is completed;

second game information allowing a second selection input by a second player when a second event requiring the second selection input by the second player occurs in the game, the second game information based on a second selection authority flag indicating that the second player has selection authority; and second response information corresponding to the second selection input by the second player acquired by the acquisition means based on a second response completed flag indicating that the second selection input is completed; and wherein the supply means supplies:

the first game information to a first terminal device operated by the first player;

the second game information to a second terminal device operated by the second player; and the first and second response information to the first and second terminal devices of the first and second players, respectively.

2. The information supply system as defined in claim 1, wherein the information generation means causes the generation of the first and second events requiring the first and second selection inputs by the first and second players, respectively, based on the game situation.

3. The information supply system as defined in claim 1, further comprising:

mail generation means which generates notice information notifying receipt of the first or second selection input in electronic mail format, when the acquisition means acquires the first or second selection input by the first or second player, respectively, wherein the supply means supplies the generated notice information as electronic mail to the terminal device operated by the second player or first player, respectively.

4. The information supply system as defined in claim 1,
wherein the acquisition means acquires personal information including identification information of the player and a captured image of the player, through a personal information input device having input means and capturing means; and
wherein the information generation means uses the acquired personal information to generate the information to be used to perform the multi-player game.

5. An information supply system for a multi-player game comprising:
information generation means which generates information used to perform the multi-player game at a predetermined terminal device based on a selection input by a player;
supply means which supplies the generated information to the terminal device;
acquisition means which acquires the selection input by the player through the terminal device; and
determination means which automatically determines a content of the selection input by at least one of the first and second players, when the acquisition means has not acquired any selection input information from at least one of the first and second players within a predetermined time,
wherein the multi-player game is a concurrent selection input type of game wherein different responses are output in correspondence to selection inputs;
wherein the information generation means generates:
game information allowing the selection inputs by first and second players when a predetermined event requiring the selection input occurs in the game; and
response information corresponding to the selection inputs by the first and second players acquired by the acquisition means; and
wherein the supply means supplies the game information and the response information to first and second terminal devices operated by the first and second players, respectively,
wherein the information generating means uses the selection input having the content determined by the determination means to generate information used to perform the multi-player game.

6. The information supply system as defined in claim 5,
wherein the determination means determines the content of a selection input for at least one of the first and second players at random, or by a lottery, or based on any one of a selection input order, time elapsed in the selection input, a time at which the selection input is done, a game score, the state of game progress, and a region to which the first or second player belongs.

7. A program embodied on an information storage medium or in a carrier wave, and used to supply information that is used to perform a multi-player game at a predetermined terminal device, wherein variations in a story are based on a selection input by a player, the program implementing in a computer and comprising:
instructions for generating the information used to perform the multi-player game;
instructions for supplying the generated information to the terminal device; and
instructions for acquiring the selection input by the player through the terminal device,
wherein the multi-player game is an individual selection input type of game wherein different responses are output in correspondence to selection inputs;
wherein the instructions for generating the information further includes:
instructions for generating first game information for allowing a first selection input by a first player when a first event requiring the first selection input by the first player occurs in the game, the first game information based on a first selection authority flag indicating that the first player has selection authority;
instructions for generating first response information corresponding to the first selection input by the first player acquired through the instructions for acquiring the selection input based on a first response completed flag indicating that the first selection input is completed;
instructions for generating second game information allowing a second selection input by a second player when a second event requiring the second selection input by the second player occurs in the game, the second game information based on a second selection authority flag indicating that the second player has selection authority; and
instructions for generating second response information corresponding to the second selection input by the second player acquired through the instructions for acquiring the selection input based on a second response completed flag indicating that the second selection input is completed; and
wherein the instructions for supplying the generated information further includes:
instructions for supplying the first game information to a terminal device operated by the first player;
instructions for supplying the second game information to a terminal device operated by the second player; and
instructions for supplying the first and second response information to the first and second terminal devices of the first and second players, respectively.

8. The program as defined in claim 7,
wherein the instructions for generating the information further includes instructions for generating the first and second events requiring the first and second selection inputs by the first and second player, respectively, based on the game situation.

9. The program as defined in claim 7, further implementing in the computer and comprising:
instructions for generating notice information notifying receipt of the first or second selection input in electronic mail format, when the instructions for acquiring the selection input further includes instructions for acquiring the first or second selection input by the first or second player, respectively,
wherein the instructions for supplying the generated information further includes instructions for supplying the generated notice information as electronic mail to the terminal device operated by the second or first player, respectively.

10. The program as defined in claim 7,
wherein the instructions for acquiring the selection input further includes instructions for acquiring personal information including identification information of the player and a captured image of the player, through a personal information input device having input means and capturing means; and
wherein the instructions for generating the information further includes instructions for generating the acquired personal information to generate the information to be used to perform the multi-player game.

11. A program embodied on an information storage medium or in a carrier wave, and used to supply information that is used to perform a multi-player game at a predetermined terminal device based on a selection input by a player, the program implementing in a computer and comprising:

instructions for generating the information used to perform the multi-player game;

instructions for supplying the generated information to the terminal device;

instructions for acquiring the selection input by a player through the terminal device; and instructions for automatically determining a content of the selection input by at least one of the first and second players, when the instructions for acquiring the selection input has not acquired any selection input information from at least one of the first and second players within a predetermined time, wherein the multi-player game is a concurrent selection input type of game wherein different responses are output in correspondence to selection inputs;

wherein the instructions for generating the information further includes:

instructions for generating game information allowing the selection inputs by first and second players when a predetermined event requiring the selection input occurs in the game; and instructions for generating response information corresponding to the selection inputs by the first and second players acquired through the instructions for acquiring the selection input; and wherein the instructions for supplying the generated information supplies the game information and the response information to first and second terminal devices operated by the first and second players, respectively, wherein the instructions for generating the information uses the selection input having the content determined through the instructions for automatically determining a content to generate the information used to perform the multi-player game.

12. The program as defined in claim 11, wherein the instructions for automatically determining a content further includes determining the content of the selection input for at least one of the first and second players at random, or by a lottery, or based on any one of a selection input order, time elapsed in the selection input, a time at which the selection input is done, a game score, the state of game progress, and a region to which the first or second player belongs.

* * * * *